(12) United States Patent
Dobberphul et al.

(10) Patent No.: US 9,840,244 B2
(45) Date of Patent: Dec. 12, 2017

(54) ELECTROMECHANICAL BRAKE BOOSTER

(71) Applicant: Volkswagen Aktiengesellschaft, Wolfsburg (DE)

(72) Inventors: Timo Dobberphul, Braunschweig (DE); Thomas Schneider, Braunschweig (DE); Joost Kessels, Braunschweig (DE); Barbara Neef, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/216,130

(22) Filed: Jul. 21, 2016

(65) Prior Publication Data

US 2017/0021816 A1    Jan. 26, 2017

(30) Foreign Application Priority Data

Jul. 21, 2015  (DE) .......................... 10 2015 213 707
Jun. 10, 2016  (DE) .......................... 10 2016 210 369

(51) Int. Cl.
*B60T 13/74*  (2006.01)

(52) U.S. Cl.
CPC ................................. *B60T 13/745* (2013.01)

(58) Field of Classification Search
CPC . B60T 7/042; B60T 8/17; B60T 8/171; B60T 8/172; B60T 8/44; B60T 13/745; B60T 13/74; B60T 13/66; B60T 13/02
See application file for complete search history.

(56) References Cited

U.S. PATENT DOCUMENTS

| | | | |
|---|---|---|---|
| 9,428,169 B2 * | 8/2016 | Zhang | B60T 13/745 |
| 9,630,604 B2 * | 4/2017 | Benzler | B60T 13/586 |
| 2014/0202145 A1 * | 7/2014 | Kuramochi | B60T 13/745 60/327 |
| 2016/0207515 A1 | 7/2016 | Foitzik et al. | |

FOREIGN PATENT DOCUMENTS

| | | |
|---|---|---|
| DE | 197 50 977 B4 | 9/2005 |
| DE | 10 2007 032 501 A1 | 1/2009 |
| DE | 10 2010 024 734 A1 | 5/2011 |
| DE | 10 2009 047 641 A1 | 6/2011 |
| DE | 10 2010 061 438 A1 | 6/2012 |

(Continued)

*Primary Examiner* — Thomas J Williams
(74) *Attorney, Agent, or Firm* — Muncy, Geissler, Olds & Lowe, P.C.

(57) ABSTRACT

An electromechanical brake booster having a plunger rod for connecting a brake pedal lever to a brake master cylinder, a gear motor, which is coupled with the plunger rod, and a control device for driving the gear motor. A pedal force variable representing the pedal force and a plunger rod motion variable representing the motion of the plunger rod are supplied to the control device as input variables. The control device is configured to determine a setpoint return velocity for the plunger rod with the aid of the plunger rod motion variable and an actual return velocity for the plunger rod and the pedal force variable from the setpoint return velocity and to generate an activation signal for the gear motor. This makes it possible to improve the brake release behavior and to reduce high Bernoulli forces at the end stop for the starting position of the brake pedal lever.

13 Claims, 3 Drawing Sheets

(56) References Cited

FOREIGN PATENT DOCUMENTS

| | | |
|---|---|---|
| DE | 10 2011 107 841 A1 | 1/2013 |
| DE | 10 2012 209 157 A1 | 12/2013 |
| DE | 10 2013 217 579 A1 | 3/2015 |
| DE | 10 2014 226 248 A1 | 6/2016 |
| DE | 10 2014 226 255 A1 | 6/2016 |
| EP | 1 802 498 B1 | 9/2008 |

* cited by examiner

ELECTROMECHANICAL BRAKE BOOSTER

This nonprovisional application claims priority under 35 U.S.C. §119(a) to German Patent Application No. 10 2015 213 707.4, which was filed in Germany on Jul. 21, 2015, and German Patent Application No. 10 2016 210 369.5, which was filed in Germany on Jun. 10, 2016, and both of which are herein incorporated by reference.

BACKGROUND OF THE INVENTION

Field of the Invention

The invention relates to an electromechanical brake booster, comprising a plunger rod for coupling a brake pedal lever to a brake master cylinder, a gear motor, which is coupled with the plunger rod, and a control device, which is connected to the gear motor for the purpose of driving the same.

Description of the Background Art

An electromechanical brake booster is known, for example, from DE 10 2007 032 501 A1. Due to the connection between the brake pedal lever and the brake master cylinder, in contrast to systems using a pedal simulator, the pedal effort applied by the driver may be used to build up braking pressure in the brake master cylinder. Force may be applied with the aid of the electromechanical brake booster both in the direction of the pedal effort and in the opposite direction, for example to support the driver in a braking operation or to assist in the return of the brake pedal lever to its starting position.

Due to friction and hysteresis effects, the return of the brake pedal lever using hydraulic pressure in the brake master cylinder may be slower than desired under certain circumstances. From time to time, the problem also arises that the plunger rod velocity is too high toward the end of the return motion, so that high Bernoulli forces may occur at the end stop for the starting position of the brake pedal lever. This is caused, in particular, by return springs situated in the system, which provide a defined response force in the starting position of the brake pedal lever. A response force of this type is generally felt to be positive for the pedal feel and has a brand-typical and vehicle-typical setting.

In this connection, if a pedal force $F_P=0$ is present at the brake pedal lever, DE 10 2007 032 501 A1 proposes to generate a negative power assist in the brake booster which is directed in the opposite direction to the usual actuation of the brake pedal lever, the negative power assist transitioning to a positive power assist, which assists the pedal force as the pedal force increases. A mechanical return spring within the brake booster may be omitted hereby, or it may be designed to be much softer and be less tightly pretensioned. The lack of force for an optimum response force is actively generated by the brake booster. For this purpose, an assistance characteristic is provided, which predefines the power assist of the brake booster as a function of the detected pedal force $F_P$.

SUMMARY OF THE INVENTION

It is therefore an object of the present invention to further improve the return of the brake pedal lever.

In an exemplary embodiment, an electromechanical brake booster is provided, that includes a plunger rod for coupling a brake pedal lever to a brake master cylinder, a gear motor, which is coupled with the plunger rod, and a control device, which is connected to the gear motor for the purpose of driving the same. It is characterized in that a variable representing the pedal force, hereinafter referred to as "pedal force variable," and a variable representing the motion of the plunger rod, hereinafter referred to as "plunger rod motion variable," are supplied to the control device as input variables, and the control device is configured to determine a setpoint return velocity for the plunger rod with the aid of the plunger rod motion variable and possibly other influencing variables, and to generate an activation signal for the gear motor from the setpoint return velocity, the actual return velocity of the plunger rod and the pedal force variable.

The brake release behavior may be improved hereby, and high Bernoulli forces at the end stop may be reduced.

In particular, an active return of the plunger rod of the brake booster, and thus of the brake pedal lever, to the particular starting position may be achieved, which may be adapted individually as needed, possibly in a brand-typical and vehicle-typical manner, without any great complexity.

For example, the control device may be configured to ascertain a difference from the setpoint return velocity and the actual return velocity and to generate an activation signal for the gear motor as a function of this difference and the pedal force variable.

To determine the setpoint return velocity, a characteristic may be stored, for example in the control device, which predefines the setpoint return velocity as a function of the position of the brake pedal lever. The position of the brake pedal lever may be detected via the position of the plunger rod, the position of the gear motor or in another way. This makes it possible to predefine another return velocity of the brake pedal lever, depending on the position thereof. In this manner, the transition of the brake pedal lever to other motion areas, such as the end position of a clearance compensation, may be specifically designed in such a way that no haptic or acoustic abnormalities occur.

Moreover, in addition to the plunger rod motion variable, the pedal force variable may also be taken into account to determine the setpoint return velocity.

The actuation signal of the gear motor can be a variable representing the motor torque.

The control device may furthermore be configured in such a way that the activation signal of the gear motor is limited to a predefined value range for the return of the plunger rod. Moreover, if necessary, the gradient of the activation signal may also be limited in the predefined value range. Plunger rod return motions which feel unnatural may be excluded thereby.

According to embodiment of the invention, a sensor which interacts with the plunger rod or the brake pedal lever is provided to detect the plunger rod motion variable. For example, the absolute position can be detectable with the aid of a sensor of this type. In addition, the motion velocity may be derived therefrom as needed. However, it is also possible to detect corresponding position information about the location and velocity of the plunger rod in another way.

According to an embodiment of the invention, a sensor for detecting the pedal force variable can be provided, which is a force sensor disposed on the plunger rod or the brake pedal lever or a pressure sensor for detecting the admission pressure generated by the brake master cylinder. If necessary, the data of both a force sensor and a pressure sensor may be taken into account in the pedal force variable.

To generate the activation signal, a factor for the difference between the setpoint return velocity and the actual return velocity and a factor for the pedal force variable may be determined with the aid of the characteristics stored in the control device, these factors being multiplied by each other to particularly easily obtain the activation signal for the gear motor.

A temperature signal may also be involved in the generation of the activation signal. It is possible to compensate for temperature-induced effects hereby. At low temperatures, in particular, the system friction may increase, and the return behavior of the brake pedal lever may change.

For this purpose, a component temperature can be detected in the surroundings of or directly at the brake pedal lever. If necessary, temperature sensors installed on the brake booster may also be used to detect the temperature.

The temperature signal can be taken into account in such a way that the return of the brake pedal lever is represented in the same manner at any temperature.

A signal representing the vehicle velocity may furthermore be involved in the generation of the activation signal.

Another factor, which is settable by the driver, may also be involved in the generation of the activation signal, for the purpose of influencing the characteristic of the plunger rod return. This makes it possible for a more sporting or a more comfortable pedal characteristic to be selected by the driver, as desired.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
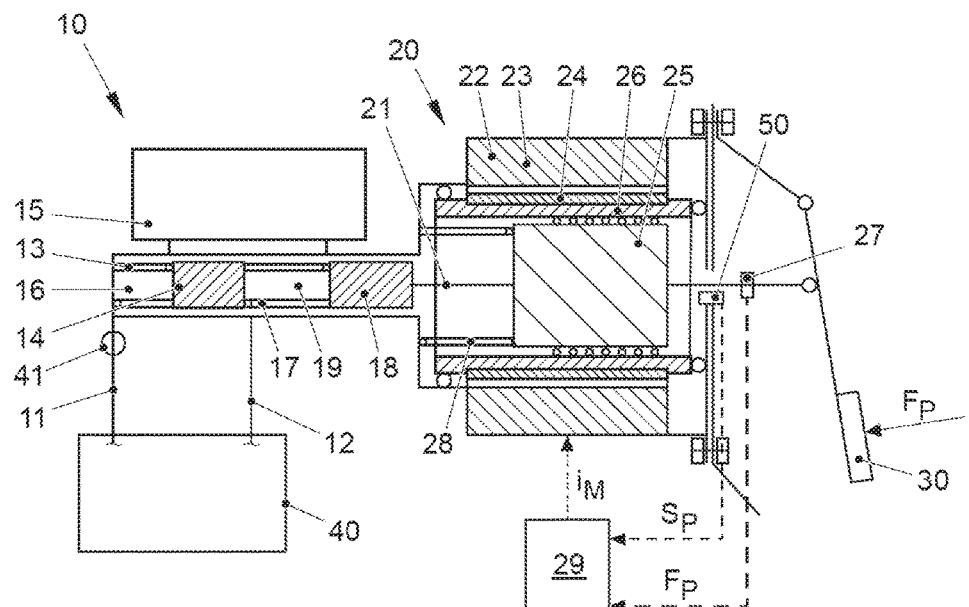
FIG. 1 shows an electromechanical brake booster, which is coupled between a brake pedal lever and a tandem brake master cylinder of a vehicle brake system, according to an exemplary embodiment of the invention.

The exemplary embodiment in FIG. 1 shows a vehicle brake system comprising a brake master cylinder 10, an electromechanical brake booster 20 and a brake pedal lever 30. An ESP hydraulic unit 40, via which wheel brakes of the individual vehicle wheels are activated, is connected to tandem brake master cylinder 10.

Brake master cylinder 10 is connected to hydraulic unit 40 via two brake circuits 11 and 12. The two brake circuits 11 and 12 are activated via a first secondary piston 14 supported by a first return spring 13 and by a second primary piston 18 supported by a second spring 17. First spring 13 is used to push back secondary piston 14 so that brake fluid is able to flow back from a reservoir 15 into a first pressure chamber 16 of brake master cylinder 10. If a leak occurs in second hydraulic brake circuit 12, additional spring 17 is used to separate secondary piston 14 from primary piston 18, so that brake fluid is able to flow out of reservoir 15 into another pressure chamber 19 between secondary piston 14 and primary piston 18. Springs 13 and 17 are designed in such a way that they execute this return motion of both pistons 14 and 18 in all driving situations. Brake master cylinder 10 explained above and illustrated in FIG. 1 is only exemplary in nature. Within the scope of the present invention, other types of brake master cylinders 10 which are compatible with electromechanical brake boosters 20 may be readily used.

Electromechanical brake booster 20 according to the invention includes a plunger rod 21 for connecting brake master cylinder 10 to brake pedal lever 30. This connection is preferably designed in such a way that both compressive and tensile forces are transmittable between brake master cylinder 10 and brake pedal lever 30. As is apparent, in particular, from FIG. 1, plunger rod 21 acts upon primary piston 18 of brake master cylinder 10.

Electromechanical brake booster 20 furthermore includes a gear motor 22, which is coupled with plunger rod 21. A brushless electric gear motor 22 is illustrated for this purpose in FIG. 1 only by way of example. It has a stator 23 and a rotor 24, which are arranged concentrically around plunger rod 21. A spindle drive of gear motor 22, which is also disposed coaxially to plunger rod 21, comprises a rotatably fixedly supported, yet axially movable, spindle screw 25, which is fixedly connected to plunger rod 21. Spindle screw 25 meshes via balls with a ball screw nut 26, which is driven via rotor 24 of gear motor 22. Instead of the illustrated gear motor type, however, other electric drives may be used, which permit the conversion of a torque into an axial force at the plunger rod via a rotation translation gearset.

When gear motor 22 is activated, ball screw nut 26 is set into rotation for the purpose of generating a positive or negative force at spindle screw 25 and thus at plunger rod 21 in the axial direction thereof, depending on the rotation direction. A positive force is understood to be a force which points in the same direction as a pedal force $F_P$ generated at brake pedal lever 30 by the driver during an actuation of the brake. A negative force points in the opposite direction and thus counteracts pedal force $F_P$ of the driver.

In booster mode, plunger rod 21 is pushed in the direction of brake master cylinder 10, i.e. to the left in FIG. 1, as a result of pedal force $F_P$ and a positive power assist provided by gear motor 22. Pedal force $F_P$ applied by the driver is measured at plunger rod 21, for example using a force sensor 27. Alternatively or additionally, the admission pressure generated by the brake master cylinder may be detected for this purpose with the aid of a pressure sensor 41. The coils of stator 23 of gear motor 22 are energized as a function of the detected force. As a result, rotor 24, which is provided, for example, with permanent magnets, begins to rotate. Spindle screw 26 as well as plunger rod 21 move in a translational motion in the direction of brake master cylinder 10 via ball screw nut 26, which is fixedly connected to rotor 24 or designed as a single piece, and the balls of the ball spindle drive. For this purpose, spindle screw 26 is supported in a rotationally fixed yet freely translatory manner.

If electromechanical brake booster 20 fails to work or becomes de-energized, the driver may operate the brake solely with his foot. To facilitate a reduction of the brake pressure to zero after a brake operation, the drive of electromechanical brake booster 20 may have a non-self-locking design. In particular, it may be designed in such a way that, due to the hydraulic counter-pressure, the spring system of brake master cylinder 10, including springs 13 and 17, as well as a possibly present pedal return spring 28, a sufficient restoring force is built up in brake booster 20, which returns electromechanical brake booster 20 and brake pedal 30 to the unbraked position.

This return motion may be assisted by electromechanical brake booster 20. As discussed above, oppositely oriented power assists may be represented by a reversal of the rotation direction of gear motor 22 in electromechanical brake booster 20 described above.

The invention is expressly not limited to a brake booster of the type having a gear motor 22 according to the specific embodiment in FIG. 1. Instead, other embodiments and mechanical concepts may be used for the introduction of the power assist. Other examples of the coupling of an electric motor to plunger rod 21 via a gearset are disclosed in German patent application Nos. 10 2014 226 248.8 and DE 10 2014 226 255.0, titled "Electromechanical Brake Booster" in each case, the content thereof being hereby incorporated into the present application. As described therein, the gear device of the gear motor may include, for example a crank disk and at least one lever, preferably two levers which interact with the crank disk. A gear device is furthermore possible, in which an electric drive motor drives a cam disk, whose circumference is in engagement with plunger rod 21 for the purpose of pushing the latter in the direction of the brake master cylinder to predefine a variable transmission ratio between the translational velocity of the plunger rod and the rotational speed of the drive motor.

To actively return plunger rod 21 to its unactuated starting position, an algorithm is implemented in a control device 29, for example a control unit of electromagnetic brake booster 20, which is explained in greater detail below on the basis of FIGS. 2 and 3. This algorithm uses the pedal force variable representing pedal force $F_P$ and a plunger rod motion variable representing the motion of the plunger rod as input variables.

The pedal force variable representing the pedal force is preferably the output signal of force sensor 27. However, the signal of pressure sensor 41 may also be evaluated for this purpose. In principle, all signals may be used, which enable conclusions to be drawn about pedal force $F_P$ at plunger rod 21.

The plunger rod motion variable representing the motion of plunger rod 21 is preferably detected with the aid of a sensor 50, which interacts with plunger rod 21 or brake pedal lever 30. Absolute position $s_P$ is preferably detected with respect to the unactuated starting position via a sensor 50 of this type. In addition, the actual motion velocity of plunger rod 21 may be derived therefrom as needed, which is referred to below as actual return velocity $v_{Pactual}$ if the brake is released. However, it is also possible to detect corresponding position information about the position and velocity of plunger rod 21 in another way, for example, and without being limited thereto, by evaluating the signals of a rotor position sensor of gear motor 22.

The aforementioned variables, namely the pedal force variable and the plunger rod motion variable, are supplied to control device 29 as input variables. For this purpose, sensors 27 and 50, and possibly also sensor 41, are connected to control device 29 via a signaling system.

Control device 29 is configured to determine a setpoint return velocity $v_{Psetpoint}$ for plunger rod 21 from the pedal force variable and the plunger rod motion variable as well as optionally from other influencing variables. This may take place with the aid of characteristics, characteristic maps and/or other calculation rules stored in control device 29.

A difference $\Delta v$ is thus ascertained from setpoint return velocity $v_{Psetpoint}$ and actual return velocity $v_{Pactual}$ of plunger rod 21 in control device 29.

An activation signal $i_M$ for gear motor 22, which is preferably a variable representing the motor torque of gear motor 22, is subsequently generated in control device 29 as a function of this difference $\Delta v$ and the pedal force variable.

A desired return behavior of plunger rod 21 when the brake is released may be predefined via setpoint return velocity $v_{Psetpoint}$. Any deviations may be adjusted by a corresponding activation of electromechanical brake booster 20. This compensates for friction and hysteresis losses. Deviations of the restoring forces of springs 13, 17 and 28 may also be compensated for. Under certain circumstances, individual such springs may also be replaced by electromechanical brake booster 20.

Since the position of plunger rod 21 is involved in the activation of gear motor 22, the return velocity of plunger rod 21 may be purposefully reduced before reaching the end stop for the starting position of brake pedal lever 30, so that high Bernoulli forces at the end stop are avoided.

Figure 2:
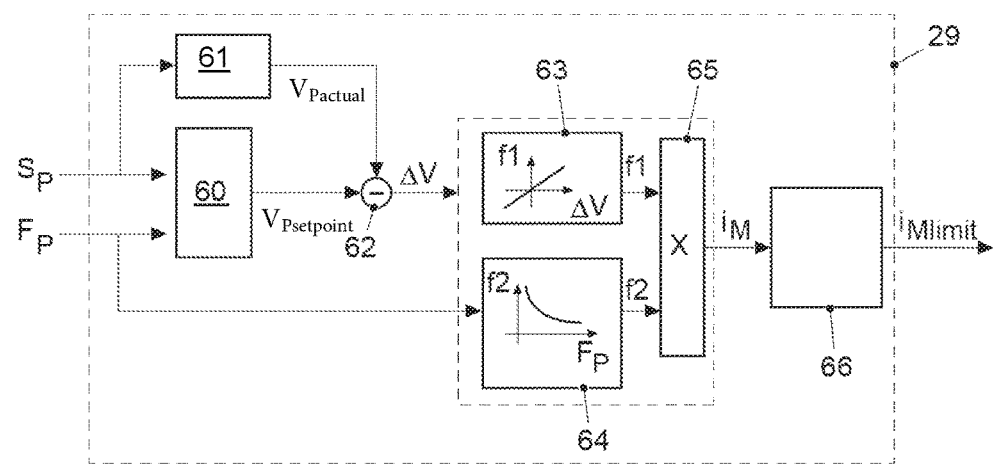
FIG. 2 shows a schematic representation of the activation system of the gear motor of the electromechanical brake booster.

FIG. 2 shows an example of the algorithm according to the invention, in which pedal force $F_P$ of force sensor 27 is used as the pedal force variable, and absolute position $s_P$ with respect to the unactuated starting position of pressure rod 21 is used as the pressure rod motion variable, measured by sensor 50. In a first block 60, setpoint return velocity $v_{Psetpoint}$ is ascertained therefrom with the aid of stored calculation rules. Parallel thereto, actual return velocity $v_{Pactual}$ is determined in a second block 61 via the mathematical derivation of travel variable $s_P$. In another operation 62, difference $\Delta v$ is calculated from setpoint return velocity $v_{Psetpoint}$ and actual return velocity $v_{Pactual}$.

To generate the activation signal, a first factor f1 is determined for difference $\Delta v$ from setpoint return velocity $v_{Psetpoint}$ and actual return velocity $v_{Pactual}$ with the aid of a first characteristic 63. Parallel thereto, a second factor f2 is determined for pedal force $F_P$ with the aid of a second characteristic 64. Activation signal $i_M$ for gear motor 22 is obtained by multiplying 65 factors f1 and f2.

Control device 29 may furthermore be configured in such a way that activation signal $i_M$ of gear motor 22 is limited to a predefined value range for the return of plunger rod 21. In addition, if necessary, the gradient of activation signal $i_M$ may also be limited in the predefined value range. For this purpose, a limiting device 66 is provided in FIG. 2, which limits activation signal $i_M$ to $i_{Mlimit}$ accordingly, before it is supplied to gear motor 22.

Figure 3:
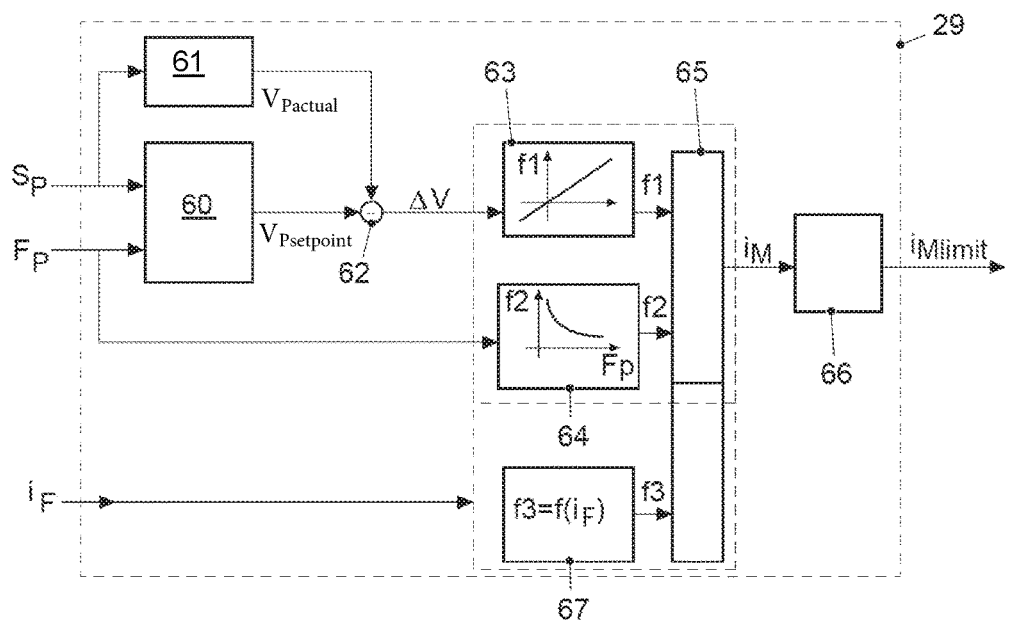
FIG. 3 shows a schematic representation of one variant of the activation system of the gear motor of the electromechanical brake booster.

FIG. 3 shows a variant of the algorithm implemented in control device 29. In this variant, another factor f3, which is settable by the driver, may also be involved in the generation of activation signal $i_M$ for the purpose of influencing the characteristic of the plunger rod return. This factor f3, for which a corresponding calculation rule 67 is provided in control device 29, is preferably involved in multiplication 65 of the other two factors f1 and f2. The factor may be set, for example by a switch in the passenger cell of a motor vehicle or by a correspondingly selectable functionality in an on-board computer, which is supplied to control device 29 as another input signal $i_F$. This makes it possible for a more sporting or a more comfortable pedal characteristic to be selected by the driver, as desired.

Figure 4:
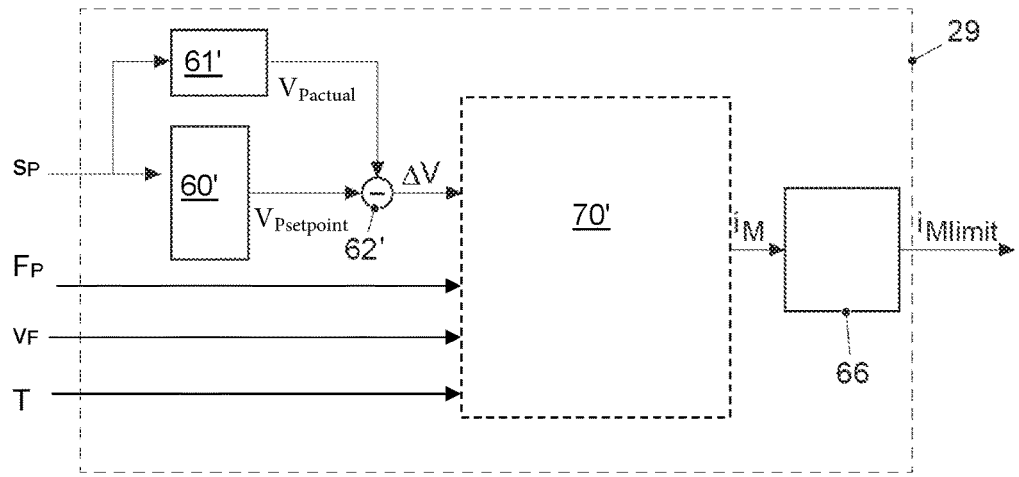
FIG. 4 shows a schematic representation of another variant of the activation system of the gear motor of the electromechanical brake booster.

FIG. 4 shows another variant of the algorithm implemented in control device 29 according to FIG. 1. This algorithm, in turn, uses a pedal force variable and a plunger rod motion variable as input variables. In addition, a temperature signal T and/or a signal representing vehicle velocity $v_F$ are optionally used as input variables.

Pedal force $F_P$ of force sensor 27 from FIG. 1 may be used as the pedal force variable, as described above. A variable which corresponds to absolute position $s_P$ of the brake pedal lever, e.g., with respect to the unactuated position thereof, is preferably used as the plunger rod motion variable. For this purpose, as illustrated in FIG. 1, a sensor 50 may be used, which detects the absolute position of plunger rod 21 or brake pedal lever 30. It is also possible to infer the position of brake pedal lever 30 by detecting the motor position of gear motor 22.

In a first block 60', setpoint return velocity $v_{Psetpoint}$ is ascertained from the plunger rod motion variable. This may take place with the aid of calculation rules stored in control device 29. In particular, a characteristic may be stored for this purpose in control device 29, which predefines setpoint return velocity $v_{Psetpoint}$ as a function of the position of brake pedal lever 30 or the detected plunger rod motion variable, $s_P$, in the present case. A desired return behavior may be very easily set via the characteristic and modified with the aid of software by reprogramming the characteristic. A type-specific or design-specific brake pedal feel may be generated for different vehicle types or designs, using the same hardware.

The pedal force variable, temperature signal T and/or the signal representing vehicle velocity $v_F$ may be involved in the ascertainment of setpoint return velocity $v_{Psetpoint}$.

Parallel to the ascertainment of setpoint return velocity $v_{Psetpoint}$, as shown in FIGS. 2 and 3, actual return velocity $v_{Pactual}$ is determined in a second block 61' by the mathematical derivation of travel variable $s_P$. In another operation 62', difference Δv is calculated from setpoint return velocity $v_{Psetpoint}$ and actual return velocity $v_{Pactual}$ and provided to a controller 70'.

Optionally, as in FIGS. 2 and 4, the gradient of the drive signal $I_M$ can be limited by limiting device 66.

To generate the activation signal, a first factor f1 is subsequently determined, in turn, for difference Δv from setpoint return velocity $v_{Psetpoint}$ and actual return velocity $v_{Pactual}$ with the aid of a first characteristic 63. Parallel thereto, a second factor f2 is determined for pedal force $F_P$ with the aid of a second characteristic 64. Activation signal $i_M$ for gear motor 22 is obtained by multiplying 65 factors f1 and f2. Moreover, as shown in FIGS. 2 and 3, means may be provided for limiting activation signal $i_M$ for gear motor 22 to a predefined value range.

Figure 5:
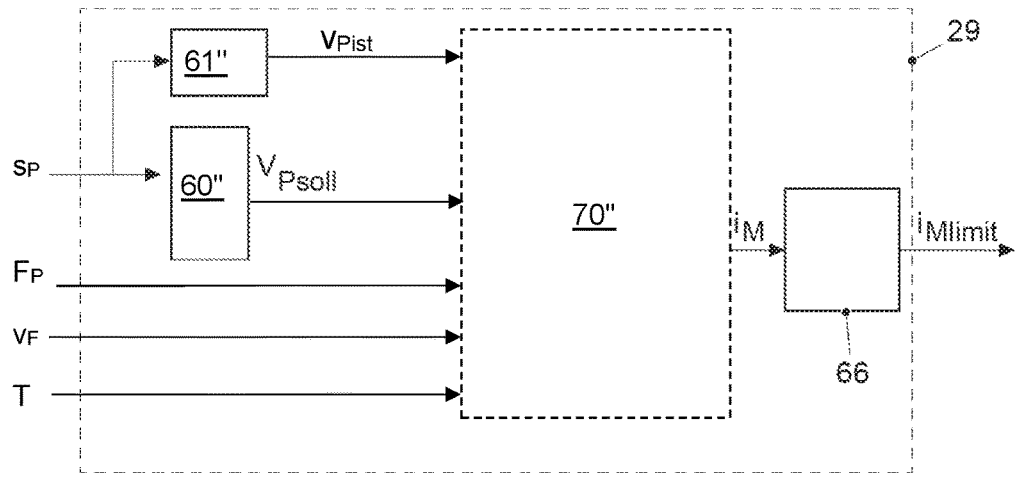
FIG. 5 shows a schematic representation of a third variant of the activation system of the gear motor of the electromechanical brake booster.

FIG. 5 shows another modification of the algorithm according to FIG. 4, the pedal force variable, the plunger rod motion variable and an optional temperature signal T and/or a signal representing vehicle velocity $v_F$, in turn, being used as input variables.

In a first block 60", setpoint return velocity $v_{Psetpoint}$ is ascertained from the plunger rod motion variable with the aid of calculation rules, characteristics and the like stored in control device 29, as already described above. The actual return velocity $V_{Pactual}$ is also determined accordingly in block 61".

Setpoint return velocity $v_{Psetpoint}$, actual return velocity $v_{Pactual}$, the pedal force variable, in the form of pedal force by way of example in the present case, and the pedal force change velocity as well as optional temperature signal T and the optional vehicle velocity signal are supplied to a controller 70 as input variables. An activation signal $i_M$ for gear motor 22 is then generated in controller 70" on the basis of these variables.

The taking into account of these additional influencing variables may be used to modified control difference Δv from setpoint return velocity $v_{Psetpoint}$ and actual return velocity $v_{Pactual}$ and/or to modify setpoint return velocity $v_{Psetpoint}$ before ascertaining control difference Δv.

In one design variant, an adjustment to a setpoint value stored in a memory for the return velocity of the brake pedal lever in a particular brake pedal position may take place with the aid of the measured variables of pedal force, pedal force change velocity, brake pedal position and brake pedal velocity (as variables representing the motion of the plunger rod) as actual variables. The measured values of brake pedal position and brake pedal velocity may be derived, for example, from the motor position detection of the gear motor.

The inclusion of the pedal force and the pedal force change velocity is used to detect the driver request and possibly to suppress the return of the brake pedal lever or to generate a damping to the driver motion.

The adjustment may furthermore be influenced via the vehicle velocity detected via the vehicle bus.

Moreover, the return may be changed depending on the temperature, for the purpose of specifically meeting he conditions at low temperatures. If the driver releases the previously actuated brake pedal lever, return springs ensure that the lever returns to its starting position. This return operation is influenced primarily by the spring force and the friction in the system. The return velocity may be very low at low temperatures and correspondingly higher friction. At high temperatures, or the farther the brake pedal lever is pressed, the higher is the return velocity. Unpleasant noises may occur if the brake pedal lever returns to the starting or idle position at high speed. Temperature sensors installed in the brake booster may be used to detect the temperature. A particularly slow and damped return may thus occur in the end position area, i.e., near the starting and idle position of the brake pedal lever, thereby minimizing acoustic effects upon reaching the end position.

Clicking noises may also be prevented by a targeted setpoint return velocity.

The invention explained above is based on an adjustment which influences the return behavior of the brake pedal lever and returns the latter to its starting position in a defined manner via the gear motor.

Disruptive noises are avoided by a damped return to the starting position. In addition, cavitation noises in the hydraulic system of the brake master cylinder and clicking noises due to clearance may be successfully counteracted by adapting the setpoint return velocity.

An adjustment to haptics and acoustics may take place using software means and without a great deal of complexity by storing setpoint characteristics for the setpoint return velocity in a memory.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electromechanical brake booster comprising:
a plunger rod for coupling a brake pedal lever to a brake master cylinder;
a gear motor coupled with the plunger rod; and
a control device connected to the gear motor for the activation thereof, the control device receiving input variables that include a pedal force variable representing the pedal force and a plunger rod motion variable representing the motion of the plunger rod, the control device being configured to determine a setpoint return velocity for the plunger rod based on the plunger rod motion variable, and configured to generate an actual return velocity of the plunger rod from the setpoint return velocity and an activation signal for the gear motor from the pedal force variable.

2. The electromechanical brake booster according to claim 1, wherein the control device is configured to ascertain a difference from the setpoint return velocity and the actual return velocity and to generate an activation signal for the gear motor as a function of this difference and the pedal force variable.

3. The electromechanical brake booster according to claim 1, wherein, in addition to the plunger rod motion velocity, the pedal force variable is also taken into account to determine the setpoint return velocity.

4. The electromechanical brake booster according to claim 1, wherein a characteristic which predefines the setpoint return velocity as a function of the position of the brake pedal lever is stored for determining the setpoint return velocity.

5. The electromechanical brake booster according to claim 1, wherein the activation signal is a variable representing the motor torque.

6. The electromechanical brake booster according to claim 1, wherein the control device is configured such that the activation signal of the gear motor is limited to a predefined value range for the return of the plunger rod.

7. The electromechanical brake booster according to claim 6, wherein the control device is configured such that a gradient of the activation signal is limited in the predefined value range.

8. The electromechanical brake booster according to claim 1, wherein a sensor interacts with the plunger rod or the brake pedal lever to detect the plunger rod motion variable.

9. The electromechanical brake booster according to claim 1, wherein a sensor for detecting the pedal force variable is a force sensor disposed on the plunger rod or the brake pedal lever or a pressure sensor for detecting an admission pressure generated by the brake master cylinder.

10. The electromechanical brake booster according to claim 1, wherein, for the purpose of generating the activation signal, a factor for the difference between the setpoint return velocity and the actual return velocity and for the pedal force variable is determined in each case via characteristics stored in the control device, the factors being multiplied by each other to obtain the activation signal for the gear motor.

11. The electromechanical brake booster according to claim 1, wherein a temperature signal is involved in the generation of the activation signal.

12. The electromechanical brake booster according to claim 1, wherein a signal representing a vehicle velocity is involved in the generation of the activation signal.

13. The electromechanical brake booster according to claim 1, wherein an additional factor, which is settable by a driver, is also involved in the generation of the activation signal for influencing the characteristic of the plunger rod return.

* * * * *